United States Patent
Kathan et al.

(10) Patent No.: US 7,505,161 B2
(45) Date of Patent: Mar. 17, 2009

(54) METHOD, DEVICE SYSTEM AND COMPUTER PROGRAM SYSTEM FOR CARRYING OUT MAINTENANCE ON A PRINTING OR COPYING SYSTEM

(75) Inventors: Berthold Kathan, München (DE); Peter Braun, Mühldorf (DE); Thomas Schmidt-Behounek, Ebersberg (DE)

(73) Assignee: OCE Printing Systems GmbH, Poing (DE)

( * ) Notice: Subject to any disclaimer, the term of this patent is extended or adjusted under 35 U.S.C. 154(b) by 1034 days.

(21) Appl. No.: 10/475,466

(22) PCT Filed: Apr. 24, 2002

(86) PCT No.: PCT/EP02/04541

§ 371 (c)(1),
(2), (4) Date: Jan. 12, 2004

(87) PCT Pub. No.: WO02/088923

PCT Pub. Date: Nov. 7, 2002

(65) Prior Publication Data

US 2004/0114174 A1    Jun. 17, 2004

(30) Foreign Application Priority Data

Apr. 27, 2001  (DE) ............... 101 20 719
Sep. 20, 2001  (DE) ............... 101 46 378

(51) Int. Cl.
*G06F 15/00*  (2006.01)
(52) U.S. Cl. ............... 358/1.15; 358/1.14; 710/6; 710/8; 709/222; 713/2
(58) Field of Classification Search ............... 358/1.1, 358/1.15, 1.14; 709/222; 710/8, 6; 713/2
See application file for complete search history.

(56) References Cited

U.S. PATENT DOCUMENTS 5,012,434  A    4/1991  Zietlow et al.

(Continued)

FOREIGN PATENT DOCUMENTS

DE    198 53 654    8/1999

(Continued)

OTHER PUBLICATIONS

Patent Abstracts of Japan—Publication No. 2000148430-May 30, 2000.

(Continued)

*Primary Examiner*—King Y Poon
*Assistant Examiner*—Jamares Washington
(74) *Attorney, Agent, or Firm*—Schiff Hardin LLP

(57) ABSTRACT

In a system and method for maintenance of a printing or copying system, at least two system computers are provided comprising a central device control computer and a raster process computer. A print data network connection is provided for incoming print data or copy data to be rastered. A print data network connection is provided for incoming print data or copy data to be rastered. At least one of the system computers is designed as a service connection computer. A maintenance computer is connected to a maintenance data connection on the service connection computer. Control programs are loaded from the maintenance computer onto the service connection computer via a network connection.

29 Claims, 7 Drawing Sheets

U.S. PATENT DOCUMENTS

| | | | |
|---|---|---|---|
| 5,237,655 A * | 8/1993 | Statt et al. | 345/504 |
| 5,636,008 A | 6/1997 | LoBiondo et al. | |
| 5,764,593 A * | 6/1998 | Turpin et al. | 713/2 |
| 6,188,851 B1 | 2/2001 | Eom | |
| 6,292,890 B1 * | 9/2001 | Crisan | 713/2 |
| 6,348,973 B1 * | 2/2002 | Vatland et al. | 358/1.15 |
| 6,636,899 B1 * | 10/2003 | Rabb et al. | 719/310 |
| 6,651,190 B1 * | 11/2003 | Worley et al. | 714/43 |
| 6,658,501 B1 * | 12/2003 | Hirano et al. | 710/15 |
| 6,732,195 B1 * | 5/2004 | Baldwin | 710/6 |
| 6,931,522 B1 * | 8/2005 | Raghavan et al. | 713/2 |
| 2002/0105663 A1 * | 8/2002 | Pappalardo et al. | 358/1.12 |

FOREIGN PATENT DOCUMENTS

| | | |
|---|---|---|
| EP | 0 602 325 | 6/1994 |
| WO | WO 98/49606 | 11/1998 |

OTHER PUBLICATIONS

Network Working Group—The TFTP Protocol (Revision 2) K. Sollins MIT Jul. 1992.

Network Working Group—Clarifications and Extensions for the Bootstrap Protocol-W. Wimer Oct. 1993.

Network Working Group—Address Allocation for Private Internets—Feb. 1996.

Network Working Group—Address Allocation for Private Internets, Mar. 1994.

* cited by examiner

METHOD, DEVICE SYSTEM AND COMPUTER PROGRAM SYSTEM FOR CARRYING OUT MAINTENANCE ON A PRINTING OR COPYING SYSTEM

BACKGROUND OF THE INVENTION

The invention concerns a method, a device system and a computer program system for the maintenance of a printing or copying system.

In particular, of interest are those printing or copying systems that comprise at least two system computers, namely a central device control computer that activates a plurality of aggregates and a raster processor computer, connected with the device control computer, that comprises a print data network connection for incoming print or copy data to be raster scanned.

Such a printing or copying system is, for example, specified in WO 98/49606 A1. A raster processor for such an electrophotographic printer is, for example, known from U.S. Pat. No. 5,012,434.

The individual computers of such device systems comprising a plurality of system computers do not always comprise input and output devices such as keyboards, display screens, etc. For maintenance of such systems, it is therefore as a rule necessary to dock to the system or to an individual system computer with a maintenance computer specially arranged for it. However, the problem thereby sometimes exists that the computer to undergo maintenance already exhibits a fault in its basic functions, and thus the accessibility to the system is hampered or entirely impossible. In computer systems whose operating system files are stored on a hard drive, the problem sometimes occurs that the hard drive is defective, and thus not even the fundamental operating system functions are available. In this situation, the computer today must for the most part be newly booted via a system diskette or a system CD-ROM, i.e. must be loaded with the operating system data.

In the publication "Preboot Execution Environment (PXE) Specification" by the Intel Corporation, Vers. 2.1 (Sep. 20, 1999), typical system structures and events are specified in connection with the booting of a computer.

The document with the title "THE TFTP PROTOCOL (REVISION 2) compiled by the Massachusetts Institute of Technology for the Network Working Group, and edited by K. Sollins in July 1992. It bears the document numbers Request for Comments (RFC) Nr. 1350, as well as the identifiers STD 33, Obsoletes RFC 783. Technical details of the TFT [sic] protocol established in Internet systems are specified in this document.

The document with the title "Clarifications and Extensions for the Bootstrap Protocol", compiled by Carnegie Mellon University for the Network Working Group and edited by M. Wimer in October 1993. It bears the document numbers Request For Comment (RFC) Nr. 1542 as well as the identifiers Updates 951 and Obsoletes 1532. Technical details of the bootstrap protocol established in Internet systems are specified in this document.

The publications cited above, as well as other publicly available specifications cited in the following specification, such as the documents RFC Nr. 1918 and RFC Nr. 1597, are hereby included in the present specification by reference.

SUMMARY OF THE INVENTION

It is an object of the invention to ease service applications on printing or copying systems with a plurality of system computers, of which at least one is no longer capable of booting independently.

According to the method and system for maintenance of a printing or copying system, at least two system computers are provided comprising a central device control computer that activates a plurality of aggregates in a raster process computer connected with the device control computer. A print data network connection is provided for incoming print data or copy data to be rastered. At least one of the system computers is designed as a service connection computer that comprises a maintenance data connection. A maintenance computer is connected to the maintenance data connection. A network connection is established between the service connection computer and the maintenance computer. Control programs are loaded from the maintenance computer onto the service connection computer via the network connection.

DESCRIPTION OF THE PREFERRED EMBODIMENT

Figure 1:
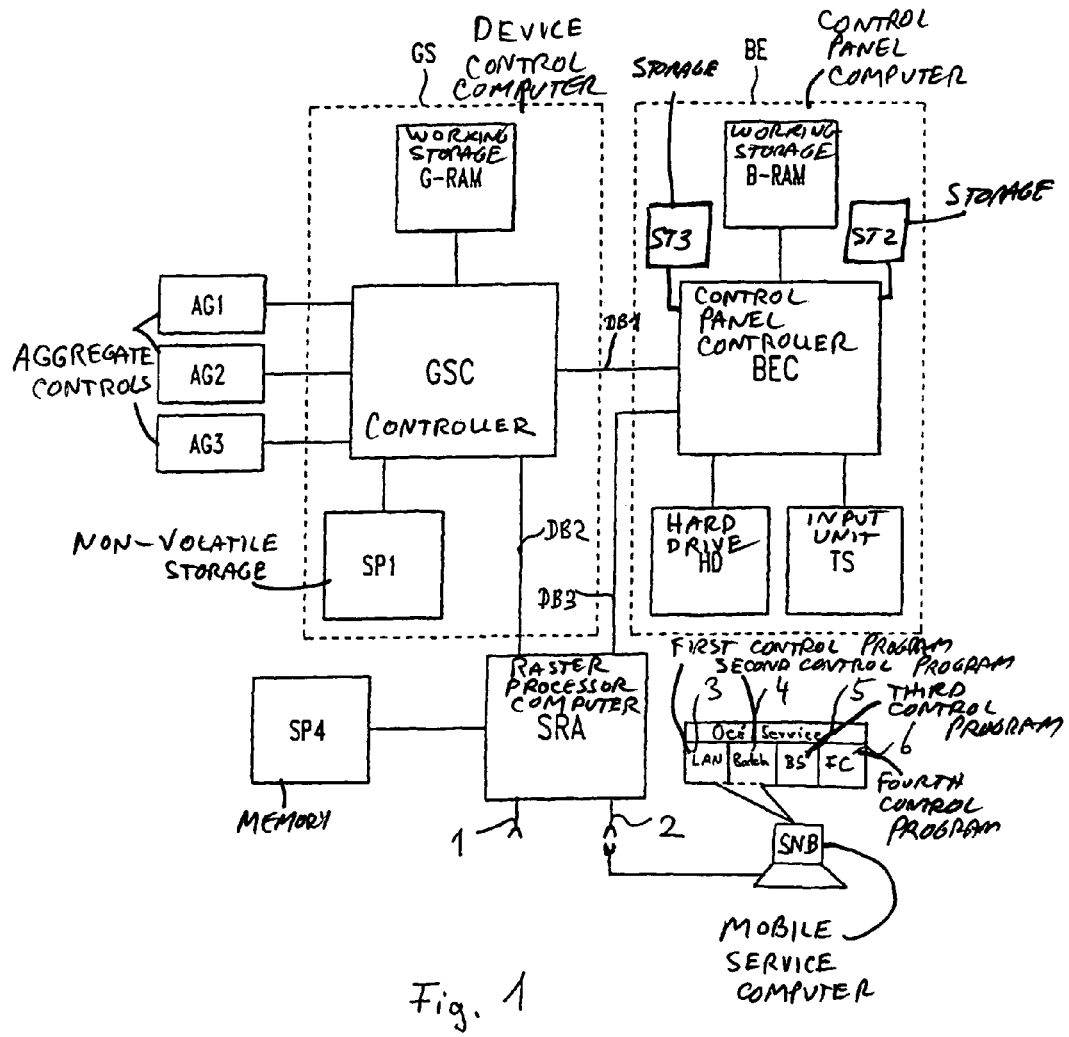
FIG. 1 shows various system computers of a printing system.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

A printing or copying system that comprises at least two system computers (of which one is designed as a service connection computer with a maintenance data connection) is connected via the maintenance data connection with a maintenance computer. First, the maintenance computer is thereby connected to the disconnected service connection computer. In the course of the connection procedure, a network connection is produced between the service connection computer and the maintenance computer, via which at least a minimal data exchange is possible, in particular with a basic input/output system. Furthermore, the basic input/output system in particular tests the line as to whether operating system data are available at difference interfaces of the connection computer and, as the case may be, loads these from the first interface comprising operation data onto the service connection computer. The sequence of the testing of the interfaces is in particular selected such that the testing of the maintenance data connection occurs before the testing of a hard drive connection. Because of this preference of the maintenance data connection with regard to the other data connections, in particular to the hard drive connection, it is effected that erroneous data from the hard drive do not arrive in the working storage of the service connection computer. Faulty boot events, and with them possible connected time losses in the maintenance event, are thereby prevented.

The testing sequence for the various interfaces (maintenance data connection, other network connections, CD-ROM, hard disk drive, SCSI connection) can in particular be selected with mechanical, electronic and/or program-controlled switches in the service connection computer, whereby two different types of start operations are accomplished. The mechanical rearranging of the testing sequence is thereby particularly advantageous, to the effect that the maintenance data connection occurs before the testing of the hard drive connection. It can be ensured via such a mechanical changeover that a computer that cannot be accessed electronically or via program controls is in any case attended to in a safe manner with operating system data, external to the service maintenance computer, and can thereby be booted.

In particular a mobile computer can be used as a maintenance computer. This is above all of advantage when components (such as, for example, a hard drive) are exchanged on site of the printing device, and in connection with this new control programs must be installed on this exchanged component in the printing system. It is thereby advantageous that it is automatically tested with the maintenance computer as to whether a predetermined component is located in a predetermined state. Depending on a test result, either the component (in so far as it is self-installing) and/or control programs for the component (with the help of predetermined control programs that can be available in the maintenance computer) can then be installed. In particular, it can be provided to format, to partition, and/or to strike up new standard operating system programs onto a hard drive afflicted with faults or a new hard drive, whereby the system computer is newly set up and configured. Additionally, further predefined control files and/or configuration files specific to the printing device can be installed in the printing system. All sequences can largely occur automatically, in that corresponding, predetermined installation control programs or service control programs (what are known as batch programs and/or macros) run on the maintenance computer. These programs can alternatively be stored on a hard drive in the service computer or are contained on a transferable storage such as floppy discs or a CD-ROM. In the course of the new installation of data on the printing system, data can be installed both for the service connection computer and for further computers connected within the printing system.

The data connection between the maintenance computer and the service connection computer is in particular formed as a direct, individual point-to-point connection in which no further computer is connected to the connection line, whereby a greater transfer security exists. Definite transmission paths are thereby achieved, and no confusions with other computers connected on the network (for example via double seizure of IP addresses) can occur. However, it is also imaginable to initiate the connection between the maintenance computer and the service connection computer via a remote data connection and/or to effect the connection of the service connection computer per remote control by what is known as a wake-on-LAN function via the remote data connection.

In a printing system comprising a plurality of system computers in which the system computers are sequentially connected, in particular the first system computer to be connected is used as a service connection computer.

FIG. 1 shows electronic components of a printing system. A controller GSC of a device control GS is connected with various electronic aggregate controls AG1, AG2 and AG3, which respectively activate the different aggregates of the printer. The controller GSC is connected via DB1 with the control panel controller BEC of a control panel computer BE that is designed as a complete computer with hard drive HD, touch screen display and input unit TS, and a microprocessor.

The printing system moreover comprises a raster processor computer SRA (scalable raster architecture) with connected memory SP4 that receives print data in a higher print data language such as PCL (printer control language), PostScript or AFP (advanced function presentation), rasters the print data, and transmits the rastered data to the further system controller of the computer to generate the printout. The raster processor computer SRA receives the print data via an interface 1 that can be set up for point-to-point connection, for local network connection (LAN), for the System/370 channel connection (S/370) established in approximately the year 1970 by the firm International Business Machines Corp. (IBM), for a Small Computer System Interface (SCSI) connection and/or for worldwide network connections, for example as an Internet connection.

Furthermore, the raster processor computer SRA comprises a second interface 2 with which a second network connection can be formed, likewise as a point-to-point connection, as a local network connection (LAN) and/or as a worldwide network connection, for example as an Internet connection.

A point-to-point connection to a mobile service computer SNB (service note book, laptop) is formed on the second (LAN2) network connection 2 in the example shown in FIG. 1. A number of control programs are loaded or stored on the service computer SNB:

The network connection (point-to-point) to the raster processor computer SRA is established with a first control program 3.

In a second control program group 4, diverse automated, service-specific program sequences (batch programs and/or macros) are stored, via which various service-relevant events are largely automated. Counted for this are, for example, the wiping, formatting and/or partitioning of a hard drive of the raster process controller SRA or one of the other computers GS or BE. Transfers of operating system files, of files to control the raster processes (functional code) and/or of the basic device controller GSC (aggregate codes) from the service computer SNB to the service connection computer (which, in the case shown in FIG. 1, is the raster process computer SRA) can also be controlled with the programs 4.

Operating system data are comprised in the third control program group 5 that comprise printer-specific parameters, and that are prepared for this purpose to be loaded on one of the printing system computers GE, BE, SRA, in particular onto the latter.

Printer-specific control programs are comprised in the fourth control program group 6, for example the functional code for the raster processor computer cited above and/or aggregate control program for the device control GS.

Upon connection of the print data, the raster processor SRA is first started, then the device control GS, and last the control panel computer BE. A system computer connected beforehand thereby respectively controls the activation event of the next system computer, at least via a status notification "boot o.k." at a connection control procedure. The sequences upon connection of the raster processor computer SRA are later more closely explained using FIG. 3. Therefore the connection events of the device control computer and control panel computer GS, BE are first specified in the following:

After the start of the device control computer GS, a software program is loaded into its working storage G-RAM. The software program is normally copied from a non-volatile storage SP1 of the device control computer GS. This program controls the further sequences of the device control. The storage SP1 can be a non-volatile RAM (what is known as a non-volatile RAM or NV-RAM), an E-EPROM, or also a hard drive storage.

During or after the loading of the working program into the working storage G-RAM, the control panel unit BE is activated by the controller GSC of the device control GS. For this, a control panel software program is loaded into the working storage B-RAM of the control panel unit BE. This in turn activates the touch screen TS. A controller BEC of the control panel unit BE monitors the sequences within the control panel unit BE.

The data transmission between the device control GS and the control panel unit BE occurs via a data bus DB 1 to which both controllers GSC and BEC are connected. Further connections DB 2 exist between the device control GS and the raster processor computer SRA as well as DB 3 between the raster processor computer SRA and the control panel computer. The connections DB1, DB2, and DB3 can thereby alternatively be designed as point-to-point connections or also as a bus system.

To turn on the print device, the three system computers SRA, GS and BE are turned on in sequence. As a first computer, the raster process computer SRA is thereby started, then the device control computer GS, and last the control panel computer BE. Since the raster process computer SRA is the first system computer to be started, the whole printer is inoperable given a disruption of its start-up event or boot event. The raster processor computer SRA is therefore used as a service connection computer.

In the course of the start of the device control, in which the working program of the device control GS is loaded into the working storage G-RAM, the control data necessary in order to activate the various aggregate controls (AG1, AG2, and so forth) are also loaded into the working storage G-RAM. These control data are taken from the storage SP1. In the course of starting the control panel unit BE, the control data are then transferred from the working storage G-RAM of the device control GS to the working storage B-RAM of the control panel unit BE. The control panel unit BE subsequently tests whether these data respectively lie in an acceptable range of values. For this, it takes comparison values from the storage ST3. The comparison values are thereby limit values of acceptable ranges of values in the respective control data. If the control panel unit BE now determines that a control datum originating from the storage SP1 lies outside of a range of values acceptable for this datum, the control panel unit BE then generates an error signal. It is thereupon attempted to replace the data using the default value (default) from the storage ST2, and to restore the replaced data in the working storage G-RAM of the device control GS.

Figure 2:
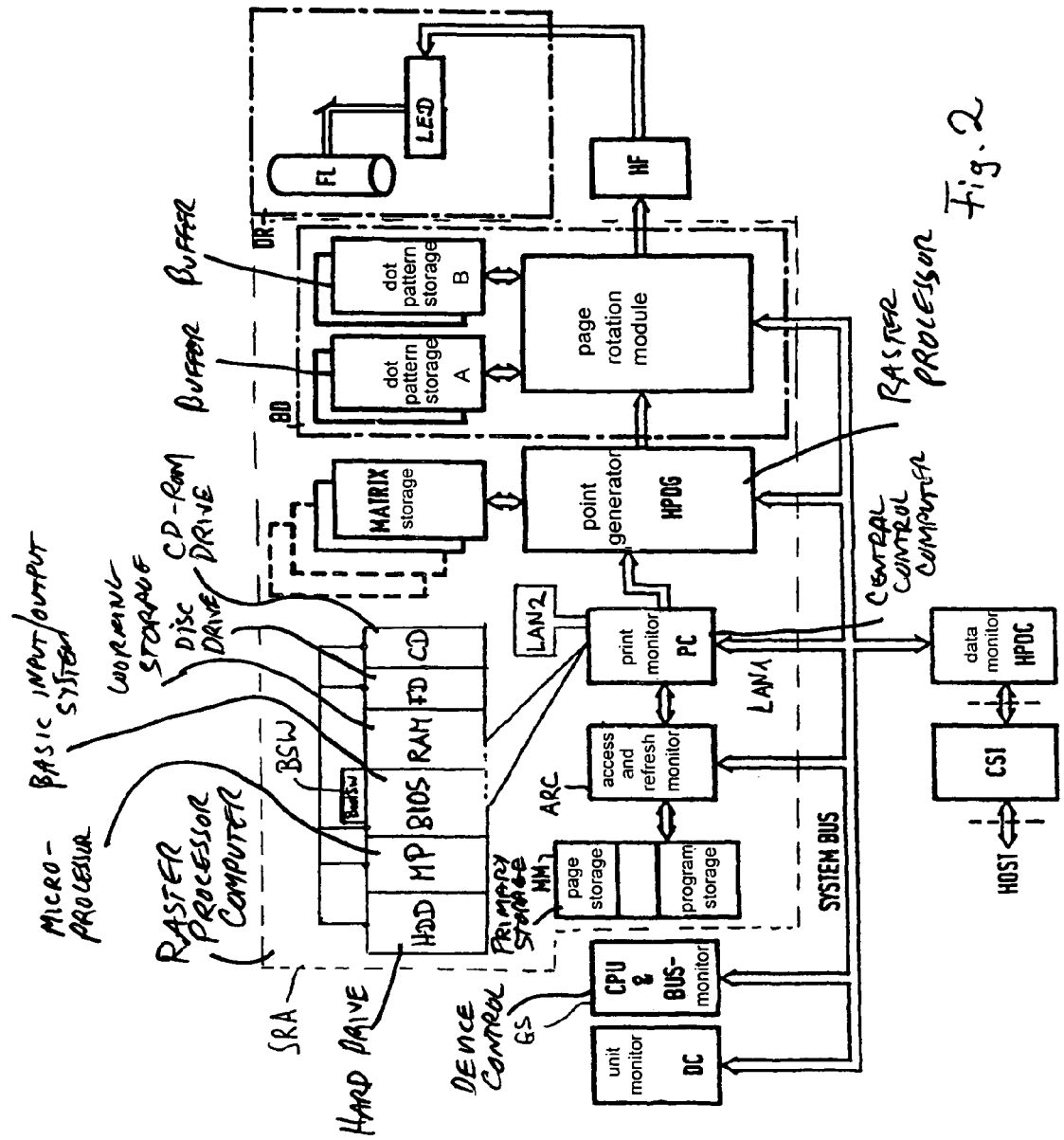
FIG. 2 shows details of a raster process computer in a printing device.

Substantial components of a print device are shown again in FIG. 2. Print data are thereby transmitted from a host system per direct point-to-point connection or via a network to a channel system interface CSI. From there, it is transmitted via a data monitoring unit HPDC to a system bus that forwards the data to the SRA controller. Within the SRA controller, the data are buffered in a primary storage MM and are transmitted via a monitoring unit ARC to a raster processor HPDG that buffers the rastered data in bitmap storage MXM. If required, the rastered image data can be rotated by means of buffers A, B in a rotation module before they are supplied to an activation unit that prepares the rastered image data for activation of a light diode comb LED. The data are there transduced into light signals with which an electrophotographic photoconductor layer FL is exposed to generate an intermediate image. This intermediate image is subsequently developed with toner according to the electrophotographic principle, and the developed image is transmitted in a transfer printing event to a recording medium (for example paper). The SRA controller is connected in this exemplary embodiment via one and the same system bus with the device control GS or with the aggregate controls DMC. However, to increase the data transfer rate, it can be advantageous to provide a first system bus for the transmission of the print data and a second system bus separate from this for the device control units (see FIG. 1).

The central control computer PC within the SRA controller comprises a first network connection LAN 1 that connects it with the system bus. For this, it comprises a second network connection LAN2 that is provided for connection of the maintenance computer. The central control computer PC within the raster process computer SRA furthermore comprises a known basic input/output system BIOS that, upon connecting the controller, gives the first control commands to the SRA controller in order to boot it. The loading of operating system files (such as, for example, Windows 98, Windows NT, Unix or Linux) is then first routed into the working storage RAM of the PC via the microprocessor MP. In a standard setup, for this the BIOS first checks as to whether operating system files are present on the hard drive HDD. When no such data are present on the hard drive interface of the PC, the interfaces of the disk drive FD and of the CD-ROM drive CD are subsequently checked for operating system data.

The interface query sequence of the BIOS can be changed by means of a mechanical switch BSM. It is provided for this to throw the switch for a service application such that first the floppy drive FD, then the CD drive CD, then the local network connection LAN 2, and finally the hard drive HDD is checked with regard to operating system data. Depending on components to be exchanged, it can also be provided to place the test for the maintenance data connection LAN 2 further forward in the test sequence, namely before the CD-ROM drive CD and/or before the floppy drive FD or possible further present additional connections such as SCSI (small computer system interface) or IDE (integrated drive electronics) recording disc connections to be provided.

Further details, functions, and effects of the structure shown in FIG. 2 are to be learned from U.S. Pat. No. 5,012,434 already cited above, in particular its FIG. 1 with corresponding specification, whose content is hereby again explicitly included by reference in the present specification at this point.

Figure 3:
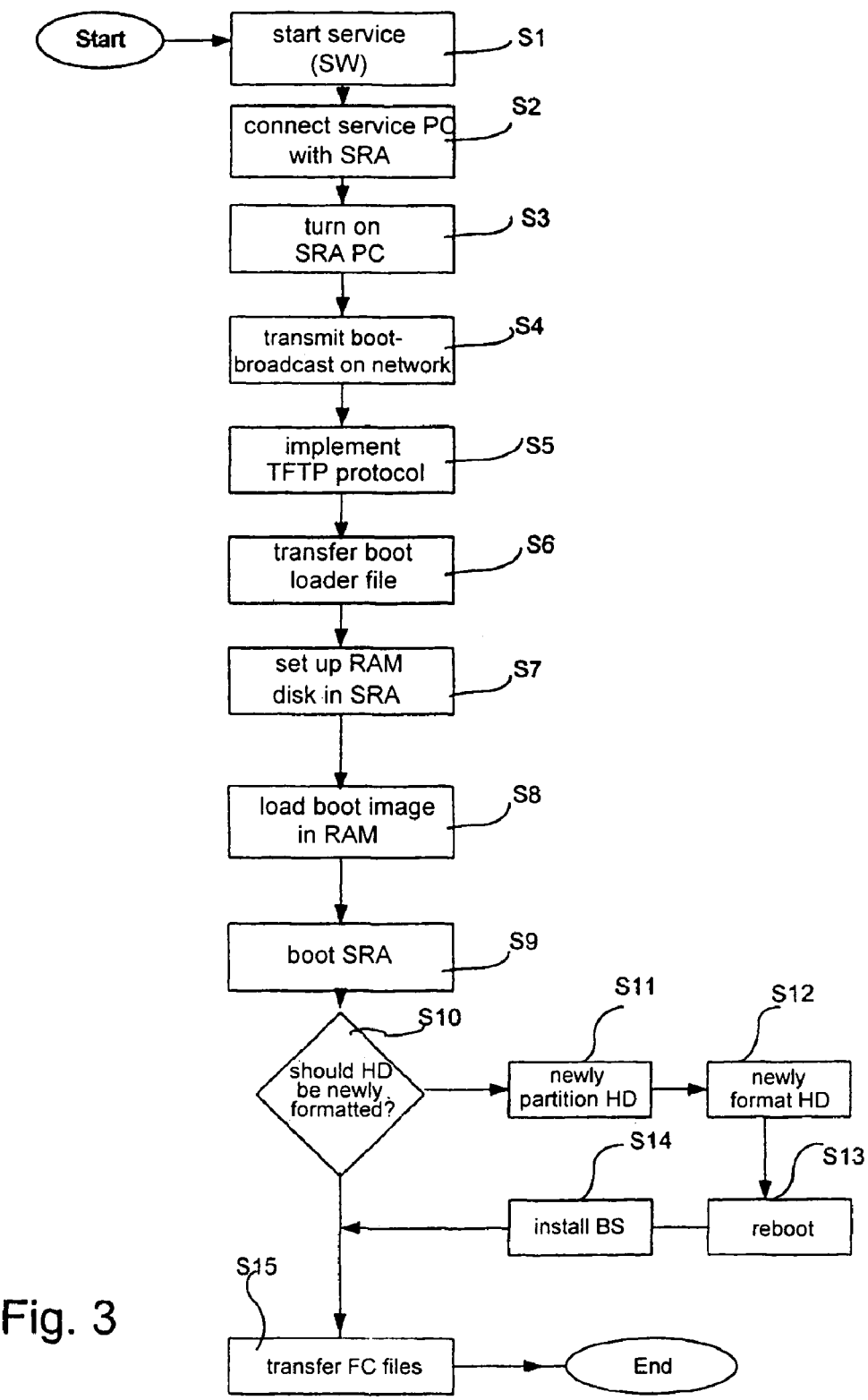
FIG. 3 illustrates a sequence diagram for a service application.

The method sequence is shown in FIG. 3 with which a maintenance application can be implemented on a raster processor computer, in that a hard drive is tested, if necessary newly partitioned and formatted, and can be provided with new operating system files, and subsequently further new system files can be installed to control the print device.

A service software is started on a maintenance computer in step S1. In step S2, the service PC is connected in a point-to-point LAN connection via the maintenance connection with the raster process computer SRA. In step S3, the SRA computer is turned on. During the connection procedure, the BIOS of the SRA computer in step S4 transmits via a broadcast network query information to its maintenance data connection. This broadcast query is recognized by the software started in the maintenance computer and in step S5 a network IP address is automatically assigned by a DHCP module (dynamic host configuration protocol) for the SRA computer. For example, the IP address 192.168.0.0/subnet mask 255.255.255.0 is thereby temporarily assigned to the SRA computer (recommended according to the standards RFC Nr. 1918 or RFC Nr. 1597). The temporary assignment remains during the boot event until the operating system in the SRA controller specially adapted to the printing device is booted and this operating system assigns a new IP address. The temporary IP address is thus valid only until the SRA controller is disconnected or, respectively, shut down, in particular in order to boot the specially adapted operating system, after which all files necessary for this were loaded into the SRA controller. What is known as a TFTP protocol (trivial file transfer protocol), based on the TCP/IP standard, is implemented afterwards as it is more closely specified in the document RFC Nr. 1350 noted above.

Further details of the involved system components and the events for accepting a connection between both computers SRA and SNB can, for example, be formed according to the publication noted above, "Preboot Execution Environment (PXE) Specification" by the Intel Corporation, Vers. 2.1 (Sep. 20, 1999 or younger date) and/or according to the TFTP protocol according to RFC document Nr. 1350 (July 1992 or younger date). These publications are for this reason and at this point again explicitly included in the present specification.

After successful completion of the TFTP connection acceptance, the SRA computer contacts the maintenance computer via the TFTP protocol. The SRA computer and the maintenance computer are thereby coupled as a client-server system, whereby the SRA computer takes on the role of the client and the maintenance computer takes on the role of the server. The maintenance computer (server) transmits in step S6, according to the TFTP protocol, what is known as a boot loader file that installs a virtual drive (RAM disc) within the SRA computer (step S7). The boot loader file is then started in the SRA computer by its BIOS and generates in the SRA controller a 1.44 MB RAM disc (Random Access Memory storage). In conjunction with this, in the step S8 a first minimal number of operating system files are transmitted by the service computer SNB to the SRA computer. Their contents correspond to those of a boot diskette in which all fundamental operating system commands are comprised that are necessary for basic operation of the SRA computer (i.e. for a booted state). Said another way, what is known as a boot image is provided that corresponds to a boot diskette (boot floppy). The boot files also comprise all drivers for the network connection of the controller drives (HDD, FD, CD) via the service PC SNB. Subsequently, the controller PC SRA is automatically newly booted with the boot image of the RAM drive (step S9). In the client SRA computer, the newly loaded boot image thereby takes on the monitoring. The boot image subsequently takes on the following functions or steps (with boot events that are partially switched in between, optional and/or mandatory):

discarding of the boot image (for each task, a new boot image is required)

| | |
|---|---|
| destroy hard drive structure | -> boot |
| partition hard drive | -> boot |
| format hard drive (partitions) | -> boot |
| load drivers and files in order to allow a network connection. | |
| install the new data (operating system, FC, . . . ) | -> boot |
| notify the server of the end of the last boot event. | | the maintenance computer transfers the data (operating system, functional code and so forth) onto the hard drive of the client the next boot image installs the new operating system, the functional code of the SRA computer, and so forth the last boot event loads the new operating system or the functional code.

As for the corresponding steps in detail: In step S10 it is decided whether the hard drive HD of the SRA controller should be newly formatted. This decision can, for example, be queried in a user dialog or be automatically predetermined by a corresponding batch program from the batch program pool 5 started in the service computer SNB. When the query is answered with "YES" or a corresponding direct program step is provided in the batch program, the hard drive HDD is first newly partitioned in step S11 and then newly formatted in step S12. Possible formattings and files present on the hard drive are thereby deleted.

These steps can already be implemented by files that were comprised in the boot image and are also loaded onto the RAM disc of the SRA controller. In the step S13, the SRA controller is newly booted and logged onto the network under a new name. Its hard disc partitions are thereby automatically associated with a drive of the service PC SNB.

In the step S14, subsequently all operating system files of the service computer SNB are loaded onto the SRA computer.

To install the operating system "Windows NT", a self-extracting installation program is transferred onto the hard drive HD of the raster computer SRA in the base directory "C:\". Controlled by the installation batch program, the system files are then extracted and installed. Data for operating system setup are also thereby transferred.

Subsequently, in step S15—that is typically implemented directly from step S10, when the hard drive is not to be newly formatted—all printer-specific device control programs (functional codes) are loaded by the service maintenance computer SNB onto the raster process computer SRA. This transfer is also batch-controlled such that the entire method sequence can be implemented completely automatically with minimal user interaction.

Figure 4:
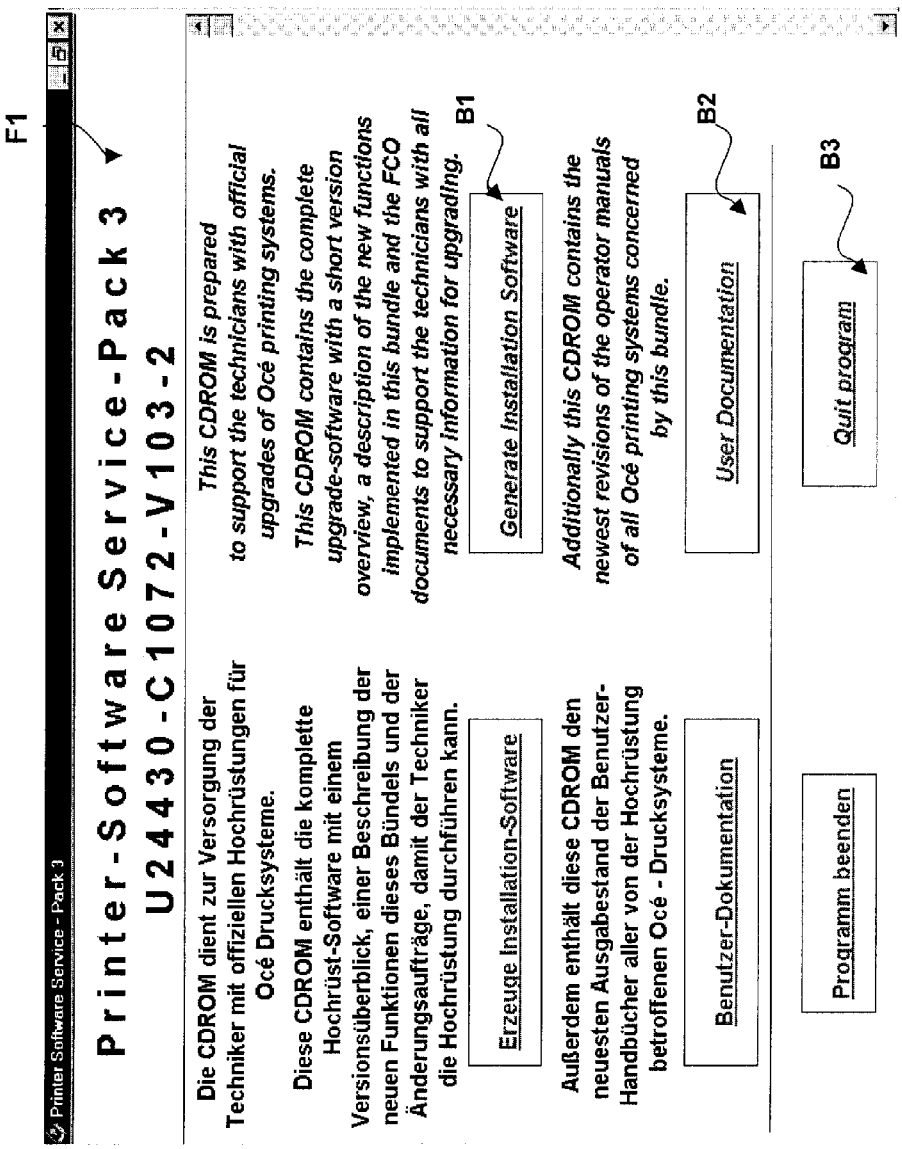
FIG. 4 illustrates a main menu for a printer service program.
Figure 5:
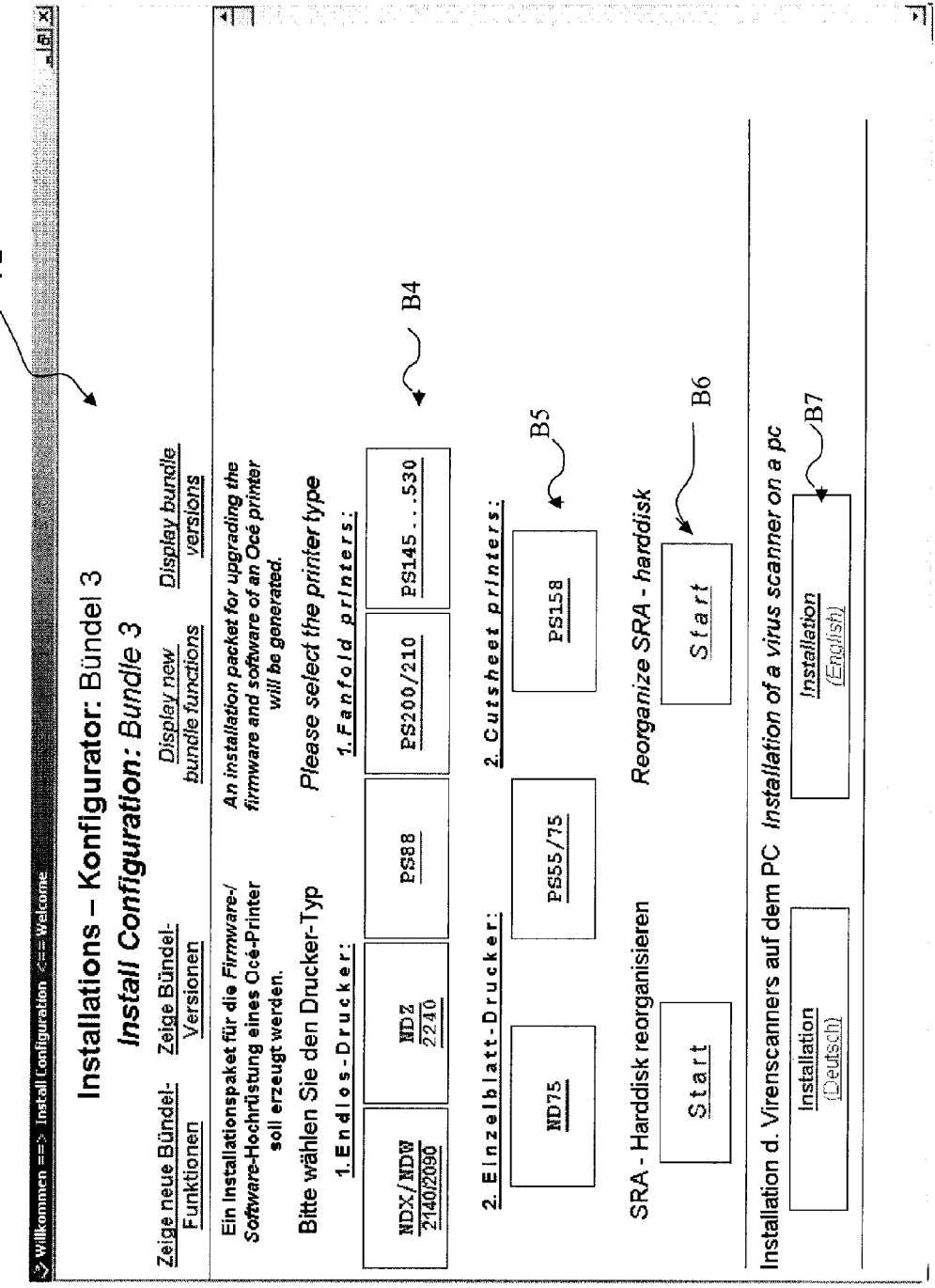
FIG. 5 shows a submenu for a printer service program.

It is clear using FIGS. 4 and 5 how simple the operation of a service program is when the control of a plurality of complex work sequences and connection acceptances is implemented fully automatically. In an input window F1, the user of the service software on the service computer SNW is called on to select a start of an installation event via a selection button B1, to load user documentation B2, or to end the program via push button B3. When the push button B1 is pressed, window 2 (FIG. 5) appears, in which various printer types can be selected, for example printers for continuous recording media via push button B4 or printers for individual pages via push button B5. By calling the corresponding printer type, type-specific aggregate control programs can be loaded in the printer control.

With the pushbutton B6, the hard drive of the raster process computer SRA can be reorganized, meaning alternatively to reorganize the storage organization, to exchange a hard drive and/or to install new system files (operating system and/or functional code). Given selection of the pushbutton P6, a further specification/selection of desired configuration options (processable print data streams, type of the raster processor, version maintenance for software) is subsequently necessary. The processes corresponding to the selection and FIG. 4 are subsequently controlled automatically and via batch programs.

With pushbutton B7, a virus protection program is installed on a connected PC independent of the other sequences.

Figure 6:
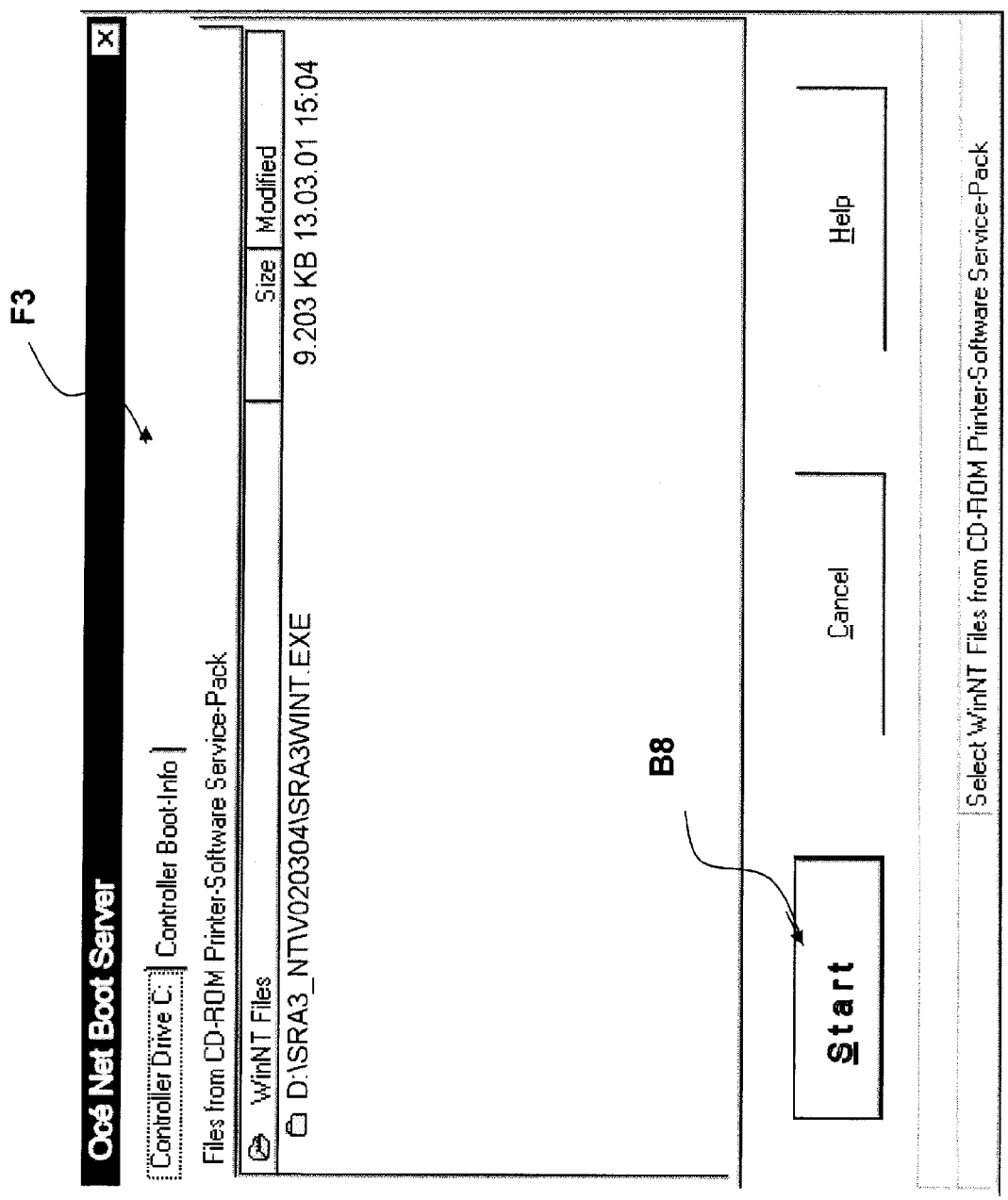
FIG. 6 illustrates a display window for installation data.
Figure 7:
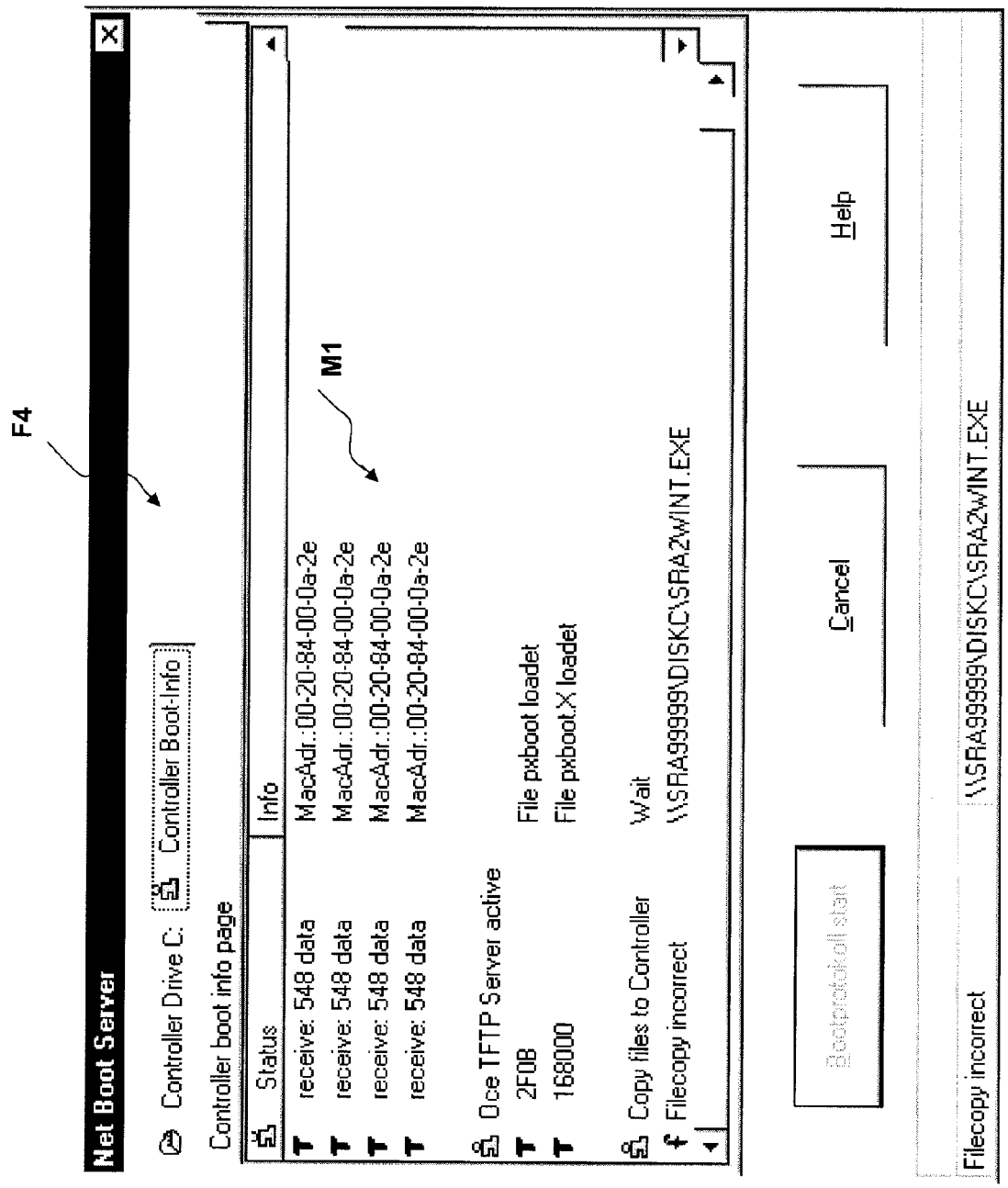
FIG. 7 illustrates a display window for tracing boot events.

A dialog window is F3 is shown in FIG. 6 with which path names and file names of selected installation files are shown that are displayed after the selection of the pushbutton B6 in FIG. 5. In FIG. 3, this corresponds to the step S1. By activating the pushbutton B8 "Start" from this menu, some security queries are started in order to make sure that the user actually wants to install a new operating system, and therewith all data stored on the hard drive of the SRA computer may be lost. The boot event designated in FIG. 3 with S4 is then started, and display window F4 displays FIG. 7 on the service computer SNB. The raster process computer is thereby booted in a known manner (with storage test events, etc.), and subsequently the point-to-point connection is formed between service computer SNB and raster process computer SRA. The connection acceptance is protocolled and traceable by the operator using the queries M1 displayed in the window F4.

The system and/or method is in particular suitable to be realized as a computer program (software). It can therewith be spread as a computer program module as a file on a data medium such as a diskette or CD-ROM, or as a file via a data network or, respectively, communication network. Such comparable computer program products or computer program elements are embodiments of the invention. The sequence can be applied in a computer, in a printing device, or in a printing system with preceding or subsequent data processing devices. It is thereby clear that corresponding computers on which the system and/or method is applied can comprise known technical devices such as input means (keyboard, mouse, touchscreen), a microprocessor, a data bus or, respectively, control bus, a display device (monitor, display) as well as a working storage, a fixed disk storage, and a network card.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for maintenance of a printing or copying system, comprising the steps of:

providing at least two system computers comprising a central device control computer that activates a plurality of aggregates and a raster process computer connected with the device control computer, and a print data network connection for incoming print data or copy data to be rastered connected to said raster process computer, said raster process computer also being a service connection computer that comprises a maintenance data connection which is separate from said print data network connection;

connecting a maintenance computer to the maintenance data connection;

turning on the service connection computer;

establishing a network connection between the service connection computer and the maintenance computer via which at least a minimal data exchange is possible;

testing the network connection as to whether operating system data are available at the network connection, and if such data are available, loading said operating system data from the maintenance computer through the network connection into the service connection computer before testing of a hard drive connection between said service connection computer and a hard drive in the printing or copying system; and loading control programs from the maintenance computer onto the service connection computer via the network connection.

2. The method according to claim 1 wherein the testing occurs via a basic input/output system.

3. The method according to claim 1 wherein the test for the network connection is selected with at least one of a mechanical, electronic and software-controlled switch provided at the service connection computer.

4. The method according to claim 1 wherein it is automatically tested with the maintenance computer whether a predetermined component resides in a predetermined state.

5. The method according to claim 4 wherein depending on a test result of the raster process computer, at least one of the predetermined component and control programs for the predetermined component is newly set up with predetermined computer standard control programs that are available on the maintenance computer.

6. The method according to claim 5 wherein the predetermined component comprises a hard disc, and wherein it is tested whether the hard drive is formatted.

7. The method according to claim 6 wherein the hard drive is at least one of newly formatted and newly partitioned.

8. The method according to claim 1 wherein a mobile computer is used as the maintenance computer.

9. The method according to claim 1 wherein the network connection established between the maintenance computer and the service connection computer is formed as a point-to-point connection.

10. The method according to claim 1 wherein the connection between the maintenance computer and the service connection computer is formed via a remote data connection.

11. The method according to claim 10 wherein a turning on of the service connection computer by remote control is controlled via the remote data connection.

12. The method according to claim 1 wherein the control programs are designed as standard programs.

13. The method according to claim 1 wherein the control programs comprise specific, predefined configuration data adapted for a printing device.

14. The method according to claim 1 wherein the control programs comprise operating system data that are limited to a data size fitting a printer.

15. The method according to claim 1 wherein the control programs comprise print system-specific device control programs.

16. The method according to claim 1 wherein the system computers are connected with one another via at least one device control line.

17. The method according to claim 1 wherein within the printing or copying system a control panel computer is additionally provided.

18. The method according to claim 1 wherein to turn on the printing or copying system, the system computers are turned on in a predetermined sequence, and a subsequent system computer is first turned on when a previously activated system computer resides in a predetermined active state.

19. The method according to claim 1 wherein the system computers are all situated within a common housing of the printing or copying system.

20. An electronic control system for maintenance of a printing or copying system, comprising:
- at least two system computers comprising a central device control computer that activates a plurality of aggregates and a raster process computer connected with the device control computer, and a print data network connection for incoming print data or copy data to be rastered connected to said raster process computer, said raster process computer also being a service connection computer that comprises a maintenance data connection which is separate from said print data network connection;
- a maintenance computer connected to said maintenance data connection;
- said maintenance computer establishing a network connection between the service connection computer and the maintenance computer via which at least a minimal data exchange is possible;
- a hard disk drive in the printing or copying system;
- said maintenance computer testing the network connection as to whether operating system data are available at the network connection, and if such data are available, loading said operating system data from the maintenance computer through the network connection into the service connection computer before testing of the hard drive connection between said service connection computer and said hard disk drive; and
- said maintenance computer loading control programs onto the service connection computer via the network connection.

21. The system of claim 20 wherein the maintenance computer comprises a mobile computer.

22. The system according to claim 20 wherein the connection between the maintenance computer and the service connection computer is formed via a remote data connection.

23. The system according to claim 20 wherein the control programs are designed as standard programs.

24. The system according to claim 20 wherein the control programs comprise specific, predefined configuration data adapted for a printing device.

25. The system according to claim 20 wherein the control programs comprise operating system data that are limited to a data size fitting a printer.

26. The system according to claim 20 wherein the control programs comprise print system-specific device control programs.

27. The system according to claim 20 wherein the system computers are connected with one another via at least one device control line.

28. The system according to claim 20 wherein in the printing or copying system a control panel computer is additionally provided.

29. The system according to claim 20 wherein the system computers are situated within a common housing of the printing or copying system.

* * * * *